United States Patent
Chou et al.

(10) Patent No.: US 7,052,559 B2
(45) Date of Patent: May 30, 2006

(54) WELDING FLUX FOR USE IN ARC-WELDING OF STAINLESS STEELS, METHOD OF WELDING STAINLESS STEEL MEMBERS USING THE WELDING FLUX

(75) Inventors: Chang-Pin Chou, Hsinchu (TW); Her-Yueh Huang, Taichung (TW); Sheang-Wen Shyu, Miaoli County (TW); Kueng-Hueng Tseng, Kaohsiung (TW); Tsung-Chieh Yang, Taichung (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 10/809,357

(22) Filed: Mar. 26, 2004

(65) Prior Publication Data

US 2005/0199317 A1    Sep. 15, 2005

(30) Foreign Application Priority Data

Mar. 9, 2004 (TW) .................................. 93106264

(51) Int. Cl.
*B23K 35/363* (2006.01)

(52) U.S. Cl. .......................................... 148/26; 148/23

(58) Field of Classification Search ................... 148/26, 148/23
See application file for complete search history.

(56) References Cited

U.S. PATENT DOCUMENTS

| | | | | | |
|---|---|---|---|---|---|
| 1,975,084 A | * | 10/1934 | Davies | ........................ | 75/307 |
| 3,585,352 A | * | 6/1971 | Zvanut | .................... | 219/137 R |
| 3,843,867 A | * | 10/1974 | Helton et al. | ........... | 219/137 R |
| 3,848,109 A | * | 11/1974 | Zvanut | .................... | 219/146.41 |
| 4,306,920 A | * | 12/1981 | Pokhodnya et al. | .......... | 148/24 |
| 5,525,163 A | * | 6/1996 | Conaway et al. | .............. | 148/23 |
| 5,804,792 A | * | 9/1998 | Paskell | ............... | 219/137 WM |

FOREIGN PATENT DOCUMENTS

JP        2000126892 A   *   5/2000

* cited by examiner

*Primary Examiner*—Daniel Jenkins
(74) *Attorney, Agent, or Firm*—Bacon & Thomas, PLLC

(57) ABSTRACT

A welding flux for use in welding stainless steel parts to increase welding penetration, consisting essentially a base material obtained from manganese peroxide ($MnO_2$), and an activator selected from a material group that includes zinc oxide (ZnO), silicon dioxide ($SiO_2$), chromium oxide ($CrO_2$), titanium dioxide ($TiO_2$), molybdenum dioxide ($MoO_2$), and iron oxide ($Fe_2O_2$).

10 Claims, No Drawings

WELDING FLUX FOR USE IN ARC-WELDING OF STAINLESS STEELS, METHOD OF WELDING STAINLESS STEEL MEMBERS USING THE WELDING FLUX

BACKGROUND OF THE INVENTION

1. Field of the Invention

The present invention relates to arc-welding and more specifically, to a welding flux for use in arc-welding of stainless steels.

2. Description of the Related Art

When joining stainless steel parts using arc-welding, a wide and shadow molten cavity will be seen in the stainless steel parts during welding, therefore a better welding effect can be achieved only when the thickness of the weld thickness is controlled below 3 mm. When going to joint thick stainless steel parts using arc-welding, for example, when welding a butt joint, a V-groove is made at the butt joint to shorten the weld thickness, and then welding the stainless steel parts through multiple welding procedures. This welding method wastes much time, thereby increasing the cost of the operation.

In 1960, PWI (Paton Welding Institute) disclosed a flux for arc-welding to increase the depth of weld pass penetration up to 5 mm. However, because the fluoride content produces a harmful gas to human beings during welding, this flux is not acceptable to most users. In 1996, EWI (Edison Welding Institute) developed an easy way to apply flux for increasing the penetration of gas tungsten arc-welding of stainless steel under U.S. Pat. No. 5,804,792. The flux essentially consists of reagent or laboratory grade TiO or $TiO_2$ (about 50%), $Cr_2O_3$ (about 40%), and $SiO_2$ (about 10%) in a liquid carrier, preferably of methyl ethyl ketone. The flux is easy to apply, increases penetration of the weld up to 5 mm. However, this composition of flux still has drawbacks. When examined the cross section of the weld pass of, for example, a butt joint, the cross section exhibited a relatively narrow middle portion and two relatively broader end portions. This problem happened due to insufficient concentration of heat energy around the two end portions of the weld pass. The uneven penetration may result in curving of the stainless steel parts during cooling. Further, when examined the outer appearance, spatters are seen around the weld pass, and a further complicated surface finishing processing process will be necessary.

SUMMARY OF THE INVENTION

The present invention has been accomplished under the circumstances in view. It is the main object of the present invention to provide a welding flux for use in welding stainless steel parts, which greatly increases welding penetration. It is another object of the present invention to provide a welding flux for use in welding stainless steel parts, which keeps a good outer looking at the weld. It is still another object of the present invention to provide a welding flux for use in welding stainless steel parts, which keeps the cross section of the weld pass in an equal width. It is still another object of the present invention to provide a welding flux for use in welding stainless steel parts, which improves the welding efficiency of stainless steel parts over 3 mm thick.

To achieve these and other objects of the present invention, the welding flux for use in welding stainless steel parts to increase welding penetration, is comprised of essentially a base material obtained from manganese peroxide ($MnO_2$), and an activator selected from a material group that includes zinc oxide (ZnO), silicon dioxide ($SiO_2$), chromium oxide ($CrO_2$), titanium dioxide ($TiO_2$), molybdenum dioxide ($MoO_2$), and iron oxide ($Fe_2O_2$). The method of joining two stainless steel members includes the steps of: a) mixing a welding flux prepared subject to claim 1 in a liquid carrier to form a paste-like flux, applying a thin layer of said paste-like flux over the joint of the stainless steel members, and welding the stainless steel members together using an arc welding torch.

DETAILED DESCRIPTION OF THE INVENTION

A welding flux for use in welding stainless steel in accordance with the first embodiment of the present invention consists essentially of manganese peroxide ($MnO_2$) and zinc oxide (ZnO). Both manganese peroxide ($MnO_2$) and zinc oxide (ZnO) have the particle size #325. Manganese peroxide ($MnO_2$) is the base material that takes about 80 wt % of the welding flux. Zinc oxide (ZnO) is an activator that takes about 20 wt % of the welding flux. The mixture of manganese peroxide ($MnO_2$) and zinc oxide (ZnO) thus obtained is added with a suitable amount of liquid carrier, for example, acetone that makes the mixture into a paste-like status. In an application example of the welding flux according to the first embodiment of the present invention, a flat brush was used to evenly apply the paste-like welding flux to the surface of the 5 mm thick 304 stainless steel butt joint to be welded over the welding arc-welding area. The total width of the applied welding flux was about 10 mm. The applied thickness of the paste-like welding flux was sufficient to mask the metal surface luster of the stainless steel. The arc-welding operation was started immediately after acetone had been completely changed into vapor.

Inert gas tungsten arc-welding (TIG) was performed on the aforesaid stainless steel parts with current 125 A and travel speed 75 mm/min. After welding, no significant spatter was seen around the welding path, and the surface of the welding path was almost in flush with the surface of the surrounding area without welding, and therefore a smooth outer appearance was obtained. When examined the cross section of the welding path (the direction perpendicular to the welding thickness of the stainless steel parts), the welding path exhibited a narrow weld pass of equal width of complete penetration in the 5 mm thick stainless steel parts.

In the aforesaid first embodiment of the present invention, the particle size of manganese peroxide ($MnO_2$) and zinc oxide (ZnO) is #325. A relatively greater particle size may result in poor bonding effect of the welding flux to stainless steel parts. Further, water, or volatile material such as methano or alcohol may be used as a liquid carrier to substitute for acetone. Other activator such as silicon dioxide ($SiO_2$), chromium oxide ($CrO_2$), titanium dioxide ($TiO_2$), molybdenum dioxide ($MoO_2$), iron oxide ($Fe_2O_2$) may be used to substitute for zinc oxide (ZnO). However, the use of zinc oxide in the welding flux according to the first embodiment of the present invention shows the best effect in flushness between the surface of the welding path and the surface of the surrounding area without welding. Further, the content of manganese peroxide ($MnO_2$) in the welding flux within 70 wt %~90 wt % shows a relatively better effect. Most preferably, manganese peroxide ($MnO_2$) is about 80 wt % in the welding flux.

A welding flux for use in welding stainless steel in accordance with the second embodiment of the present invention consists essentially of manganese peroxide ($MnO_2$), zinc oxide (ZnO), and silicon dioxide ($SiO_2$). Manganese peroxide ($MnO_2$), zinc oxide (ZnO) and silicon dioxide ($SiO_2$) have the particle size #325. Manganese peroxide ($MnO_2$) is the base material that takes about 70 wt % of the welding flux. Zinc oxide (ZnO) and silicon dioxide ($SiO_2$) are activators that take about 20 wt % and 10 wt % of the welding flux respectively. The mixture of manganese peroxide ($MnO_2$), zinc oxide (ZnO) and silicon dioxide ($SiO_2$) thus obtained is added with a suitable amount of liquid carrier, for example, alcohol that makes the mixture into a paste-like status. In an application example of the welding flux according to the second embodiment of the present invention, a flat brush was used to evenly apply the paste-like welding flux to the surface of a 5 mm thick 316 stainless steel T joint over the welding arc-welding area. Inert gas tungsten arc-welding (TIG) was performed on the stainless steel parts with current 125 A and travel speed 75 mm/min. After welding, no significant spatter was seen around the welding path. When examined the cross section of the welding path (the direction perpendicular to the welding thickness of the stainless steel parts), the welding path exhibited a narrow weld pass of complete penetration in the 5 mm thick stainless steel parts.

The main features of the present invention are as follows:
1. The welding flux causes contraction of arc beam to effectively concentrate arc energy, thereby increasing the dept of penetration of the weld.
2. The welding flux causes contraction of molten cavity, thereby increasing current density at anode spot to further form a narrow and deep cross section of weld pass.
3. The cross section of the weld pass formed by using the welding flux shows an even width, preventing curving of stainless parts during cooling.
4. Because the well pass formed by using the welding flux has an even and deep cross section and smooth outer appearance without spatter, the invention saves much pre-welding (for example, making a V-groove) and post-welding processing time (for example, performing weld pass appearance processing process), thereby increasing the production efficiency and reducing the manufacturing cost.

In addition to inert gas tungsten arc-welding (TIG), the invention is practical for use in other inert gas metal arc-welding, carbon arc-welding (CAW), submerged arc-welding (SAW), and flux cored arc-welding (FCAW). Further, in addition to the method of directly applying the welding flux to the surface of the joint, the welding flux can be applied to the workpiece by one of the following methods as: adding a foaming agent to the welding flux to form a foam-like welding flux for enabling the foam-like welding flux to be applied to the joint to weld by means of a pressure apparatus; gathering the welding flux at the joint to weld by means of a static effect; coating the welding flux on a thin-film base material and then adhering the thin-film base material to the joint to weld.

What is claimed is:

1. A welding flux for use in welding stainless steel parts, the welding flux consisting essentially of over 70 wt % manganese peroxide ($MnO_2$), and at least one activator selected from a material group that includes zinc oxide (ZnO), silicon dioxide ($SiO_2$), chromium oxide ($CrO_2$), titanium dioxide ($TiO_2$), molybdenum dioxide ($MoO_2$), and iron oxide ($Fe_2O_2$).

2. The welding flux as claimed in claim 1, wherein the total amount of said at least one activator is below 30 wt % in the welding flux.

3. The welding flux as claimed in claim 1, wherein the particle size of said base material and said at least one activator is at least #325.

4. The welding flux as claimed in claim 1, wherein the manganese peroxide base material takes about 80 wt % of the welding flux and zinc oxide is the activator that takes about 20 wt % of the welding flux.

5. The welding flux of claim 4, wherein the particle size of the base material and the activator is at least #325.

6. The welding flux of claim 1, wherein the activator present is zinc oxide and silicon dioxide.

7. The welding flux of claim 6, wherein the particle size of the base material and the activator is at least #325.

8. The welding flux of claim 6, wherein the zinc oxide take about 20 wt % of the welding flux and silicon dioxide takes about 10 wt % of the welding flux.

9. The welding flux of claim 1, wherein the activator present is zinc oxide.

10. The welding flux of claim 9, wherein the particle size of the base material and the activator is at least #325.

* * * * *